UNITED STATES PATENT OFFICE.

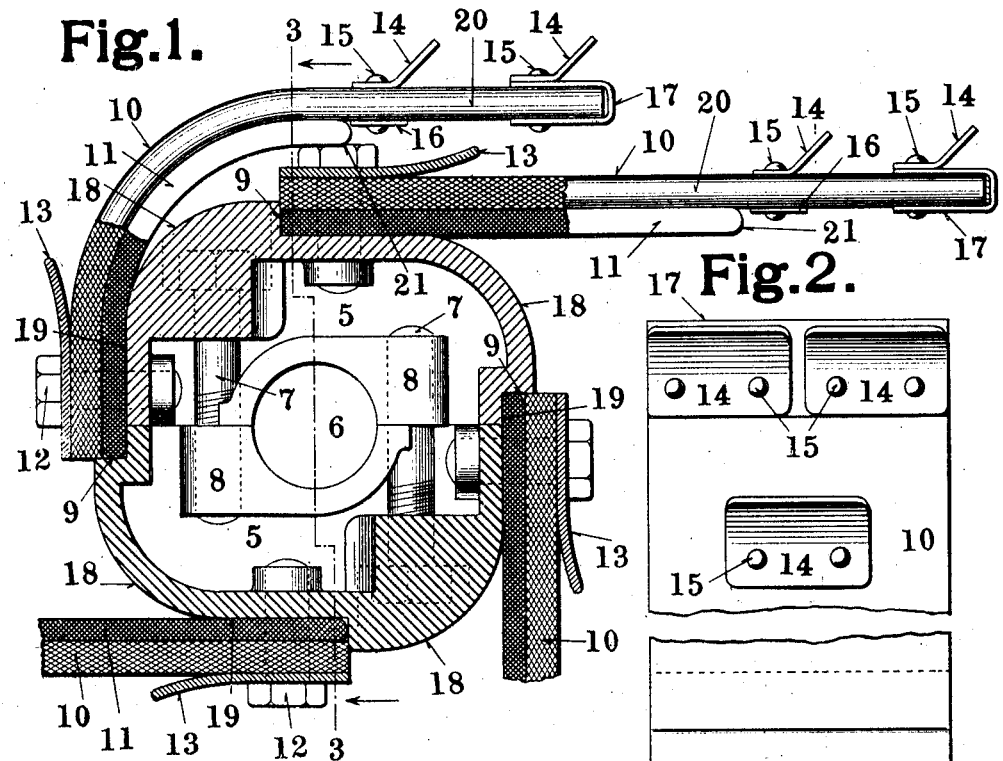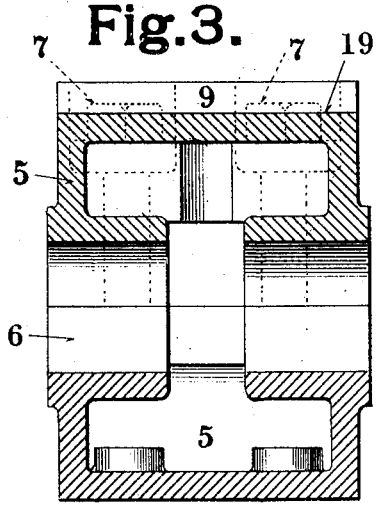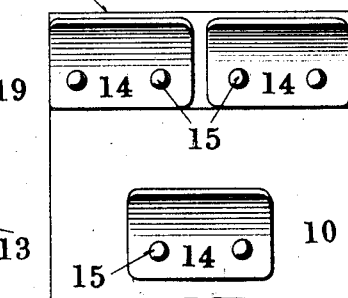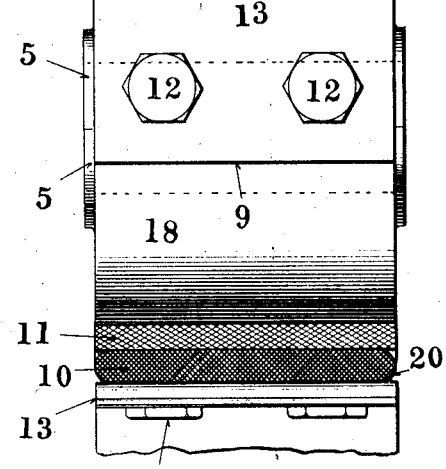

FRANK V. BRECHT AND HELMUTH W. TOHTZ, OF ST. LOUIS, MISSOURI, ASSIGNOR TO GUS V. BRECHT BUTCHERS' SUPPLY COMPANY, OF ST. LOUIS, MISSOURI, A CORPORATION OF MISSOURI.

BEATER FOR HOG-SCRAPING MACHINES.

1,352,576.  Specification of Letters Patent.  Patented Sept. 14, 1920.

Application filed April 9, 1920. Serial No. 372,417.

*To all whom it may concern:*

Be it known that we, FRANK V. BRECHT and HELMUTH W. TOHTZ, citizens of the United States of America, residing at the city of St. Louis, State of Missouri, United States of America, have invented a certain new and useful Beater for Hog-Scraping Machines, of which the following is such a full, clear, and exact description as will enable any one skilled in the art to which it appertains to make and use the same, reference being had to the accompanying drawings, forming part of this specification.

Our invention relates to a beater for hog scrapers which is particularly adapted for use in connection with a hog scraper machine such as shown in our prior application Serial No. 354,874, January 29, 1920. It may, however, be used in connection with various other types of hog scraping machines.

In the accompanying drawings which illustrate one form of beater made in accordance with our invention, Figure 1 is a vertical cross section, Fig. 2 is a side elevation, and Fig. 3 is a section taken on the line 3—3 of Fig. 1, the beater arms together with their reinforcing strips and fastening means being omitted.

5 indicates a hub which is formed in two parts each containing one half of the opening 6 adapted to receive the actuating shaft of the beater. The two parts of the hub 5 are secured together by means of bolts 7 each passing through an aperture in one part of the hub and threaded in a lug 8 carried upon the opposite part. The hub 5 is provided with a number of faces 19 preferably four in number each of which is provided with a shoulder 9 against which abuts one end of a beater arm 10. This beater arm 10 is formed of flexible material such for instance as rubber impregnated canvas. Placed against the rear face of each of the beater arms 10 is a reinforcing strip 11 formed of similar material to the beater arms 10. The arms 10, strips 11, and curved fastening strips 13 are all secured in position by means of bolts 12, the strips 11 being unconnected to the arms 10 except at the point where the bolts 12 pass through the said parts. Secured to the front face of each of the beater arms 10 are scraping blades 14 which are fastened by means of bolts or rivets 15. The scraper blades on each beater arm are preferably three in number arranged as best shown in Fig. 2 of the drawings. The bolts or rivets 15 of the rear scraper blade passing through a strip 16 on the back face of the beater and the bolts or rivets 15 passing through the forward scraper blades also securing around the end of the beater arm 10 a U-shaped protecting clip 17. Arranged between each of the shoulders 9 and the surface 19 against which the preceding beater arm is secured is a curved surface 18 which prevents injury to the rear face of the reinforcing strip 11 when the strip is bent back as shown in the upper part of Fig. 1 and at the same time allows the end of said strip to strike against the head of the bolt 12 securing the succeeding beater arm in place.

The beater arms 10 have their longitudinal edges 20 finished, that is the material is so cut as to provide selvage edges along their sides, while the reinforcing strips 11 are cut across the material so as to leave a selvage edge 21 at the outer end of the strip. In this manner the beater and reinforcing strips are prevented from raveling as would otherwise be liable to occur owing to the severe usage to which the said beater arms and reinforcing strips are subjected during the operation of the machine.

It will be evident that our beater while simple in construction is very compact and effective and not liable to become injured through use.

Having fully described our invention, what we claim as new and desire to secure by Letters Patent of the United States is:

1. In a device of the class described, a hub, a flexible beater arm of textile material secured to said hub and having longitudinal selvage edges, a protective clip secured to the outer end of said beater arm, and scraper blades secured to the face of said beater.

2. In a device of the class described, a hub provided with a plurality with flat faces forming beater seats, a curved face situated between each pair of flat faces, each flat face being tangent to one adjacent curved face and offset from the other to form a shoulder, and flexible beater arms secured against said flat face.

In testimony whereof we have hereunto set our hands and affixed our seals.

FRANK v. BRECHT. [L. s.]
HELMUTH W. TOHTZ. [L. s.]